(12) United States Patent
Huth et al.

(10) Patent No.: US 9,273,695 B2
(45) Date of Patent: Mar. 1, 2016

(54) ARRANGEMENT HAVING A SEAL, SEAL, AND TURBOCOMPRESSOR

(75) Inventors: Sebastian Huth, Mönchengladbach (DE); Dieter Nass, Moers (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 285 days.

(21) Appl. No.: 13/825,568

(22) PCT Filed: Sep. 20, 2011

(86) PCT No.: PCT/EP2011/066278
§ 371 (c)(1),
(2), (4) Date: Jun. 5, 2013

(87) PCT Pub. No.: WO2012/038398
PCT Pub. Date: Mar. 29, 2012

(65) Prior Publication Data
US 2014/0178182 A1   Jun. 26, 2014

(30) Foreign Application Priority Data
Sep. 22, 2010   (DE) .......................... 10 2010 041 208

(51) Int. Cl.
| | |
|---|---|
| *F16J 15/32* | (2006.01) |
| *F04D 29/08* | (2006.01) |
| *F04D 29/40* | (2006.01) |
| *F04D 29/42* | (2006.01) |
| *F16J 15/16* | (2006.01) |

(52) U.S. Cl.
CPC ............ *F04D 29/083* (2013.01); *F04D 29/403* (2013.01); *F04D 29/4206* (2013.01); *F16J 15/164* (2013.01); *F16J 15/3236* (2013.01)

(58) Field of Classification Search
CPC ............. F16J 12/00; F16J 15/00; F16J 15/02; F16J 15/022; F16J 15/025
See application file for complete search history.

(56) References Cited

U.S. PATENT DOCUMENTS

| | | | | |
|---|---|---|---|---|
| 2,326,489 | A | * | 8/1943 | Payne ........................... 277/385 |
| 2,330,425 | A | | 9/1943 | Hilton |
| 3,083,023 | A | | 3/1963 | Creavey |
| 4,009,798 | A | * | 3/1977 | Pechacek ................ F16J 13/08 |
| | | | | 220/315 |
| 4,179,130 | A | * | 12/1979 | Fass et al. ..................... 277/384 |

(Continued)

FOREIGN PATENT DOCUMENTS

| | | |
|---|---|---|
| CH | 235632 A | 12/1944 |
| DE | 559288 C | 2/1933 |

(Continued)

*Primary Examiner* — Vishal Patel

(57) ABSTRACT

An arrangement having an annular seal extending about a machine axis, and a vessel for sealing an L-shaped gap extending along a circumferential direction between a main vessel body and a cover is provided. A radial section of the gap extends in the radial direction and circumferential direction, and an axial segment extends in the axial direction and the circumferential direction. A sealing chamber is provided in the region where the radial segment and the axial segment intersect, the chamber expanded radially and axially relative to the adjacent gap segments. A seal is disposed in the sealing chamber, and a greater pressure is present in the radial segment than in the axial segment, the pressure differential sealed by means of the seal. The seal includes a support ring disposed radially inward made of a first material, and a jacket element made of a second material.

6 Claims, 2 Drawing Sheets

(56) References Cited

U.S. PATENT DOCUMENTS

| | | | | |
|---|---|---|---|---|
| 4,204,716 | A * | 5/1980 | Baylor | 305/103 |
| 4,426,091 | A * | 1/1984 | Baylor | 305/103 |
| 4,465,202 | A * | 8/1984 | Stoves | F16J 13/24 |
| | | | | 220/203.06 |
| 4,596,395 | A * | 6/1986 | Miser | 277/562 |
| 5,383,728 | A * | 1/1995 | Micca et al. | 277/575 |
| 5,630,591 | A * | 5/1997 | Drijver | F16J 15/025 |
| | | | | 277/553 |
| 5,799,953 | A | 9/1998 | Henderson | |
| 6,237,966 | B1 * | 5/2001 | Kearns | F16L 21/035 |
| | | | | 277/625 |
| 7,032,905 | B2 * | 4/2006 | Mullally | 277/647 |
| 8,215,646 | B2 * | 7/2012 | Castleman et al. | 277/552 |
| 2009/0194945 | A1 * | 8/2009 | Bhat | E21B 33/1212 |
| | | | | 277/300 |
| 2012/0146293 | A1 * | 6/2012 | Reeb | F16J 15/3236 |
| | | | | 277/589 |

FOREIGN PATENT DOCUMENTS

| | | |
|---|---|---|
| DE | 932396 C | 9/1955 |
| DE | 3805899 A1 | 9/1989 |
| DE | 202005006997 U1 | 7/2005 |
| EP | 0766007 A1 | 4/1997 |
| EP | 1933038 A1 | 6/2008 |

* cited by examiner

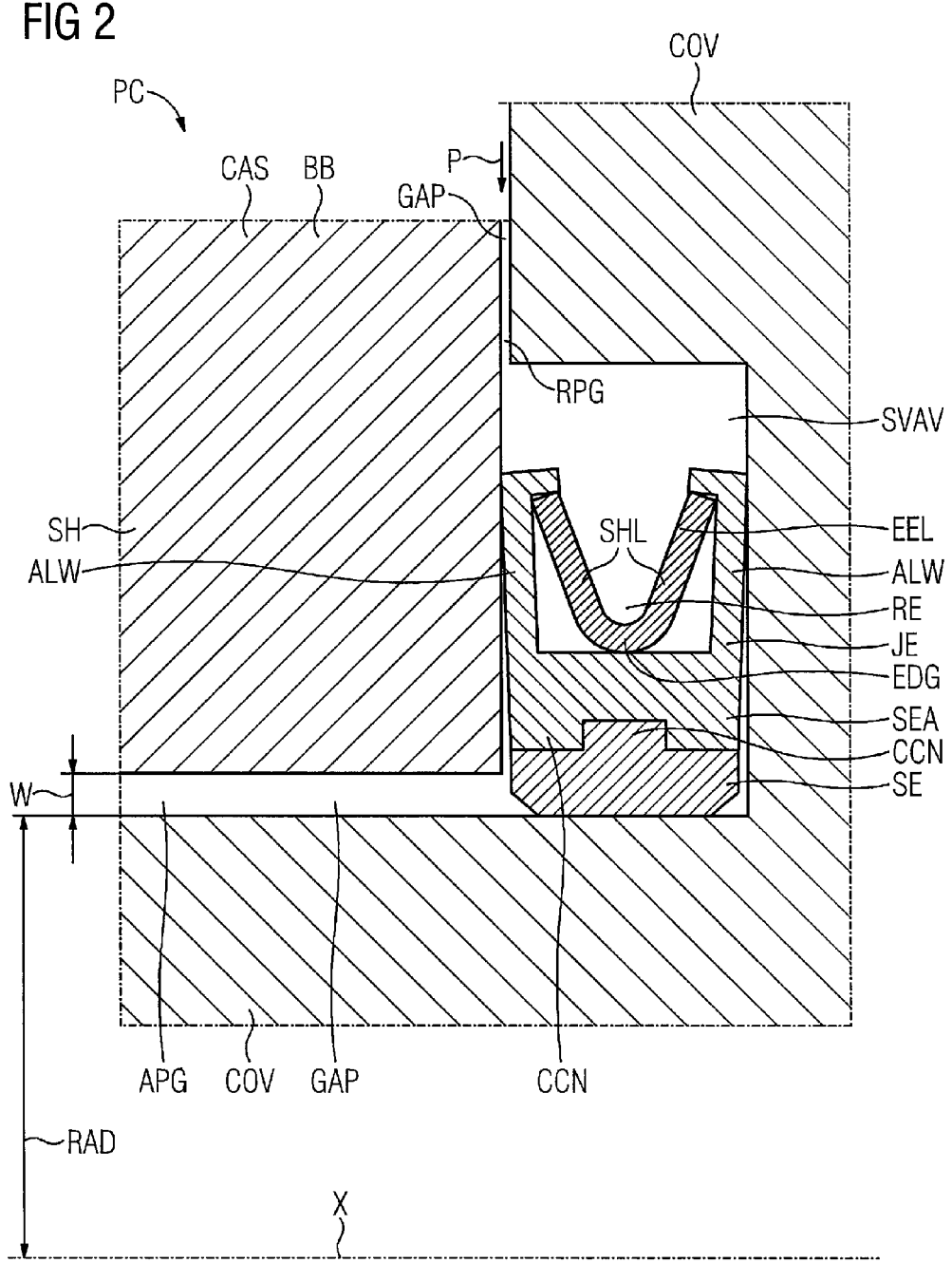

ARRANGEMENT HAVING A SEAL, SEAL, AND TURBOCOMPRESSOR

CROSS REFERENCE TO RELATED APPLICATIONS

This application is the U.S. National Stage of International Application No. PCT/EP2011/066278, filed Sep. 20, 2011 and claims the benefit thereof. The International Application claims the benefits of German application No. 10 2010 041208.2 DE filed Sep. 22, 2010. All of the applications are incorporated by reference herein in their entirety.

FIELD OF INVENTION

The invention relates to an arrangement having an annular seal which extends about a machine axis, for sealing a gap with an L-shaped cross section which extends along a circumferential direction between a vessel main body and a cover, a radial section of the gap extending in the radial direction and circumferential direction and an axial section extending in the axial direction and circumferential direction, a seal chamber being provided in the region where the radial section and the axial section meet, which seal chamber is widened radially and axially with respect to the adjacent gap sections, a seal being arranged in the seal chamber, a higher pressure prevailing in the radial section than in the axial section, which pressure difference is sealed by means of the seal. Furthermore, the invention relates to a seal of the above type and for the sealing situation which is defined above. Moreover, the invention relates to a compressor which comprises the above arrangement.

BACKGROUND OF INVENTION

In pressure vessels, in particular compressor housings, temperature differences between various modules of the pressure vessel frequently occur, in particular in non-steady-state operation. For example, in the case of a high pressure turbocompressor, a substantially cylindrical main housing can be closed on the end side by means of a cover which is preferably arranged at least partially in an axial overlap in the pressure container. As a consequence of temperature differences, a radial thermal relative expansion occurs between the end-side cover and the at least partially encapsulating housing main body, for which corresponding movement plays have to be provided. In addition, temperature differences between the described housing components have to be maintained deliberately even in steady-state operation, in order that boundary conditions for other components are met. For example, gas seals have to be operated in a comparatively narrow temperature range, with the result that, in refrigeration engineering, temperatures of below −100° C. make it necessary to heat the gas seal, in order for it to be possible to operate the gas seal in the allowable range. At least in the region of the axial overlap between the cover and the housing jacket with regard to the machine axis which extends in the longitudinal direction along a rotor, radial plays which are dependent on the external diameter of the cover of, for example, 2 mm/1000 mm external diameter of the cover have to be provided. The very recent trend toward ever larger compressor designs leads to plays which can no longer be sealed by means of conventional static seals, because the latter are destroyed in the gaps at the prevailing pressures and the size of the gaps to be sealed.

SUMMARY OF INVENTION

Proceeding from the above-described problems, the invention is based on the object of sealing particularly large gaps between two components which are at a standstill relative to one another.

In order to achieve this object, the invention proposes a development of the arrangement which is defined at the outset, by means of features of the characterizing part of the claims. Furthermore, it is proposed to develop the compressor of the type which is defined at the outset, by way of the features of them claims. Moreover, a development according to the invention of the seal which is defined at the outset having the features of the claims is proposed.

A radial plane in accordance with the claims is a plane which extends perpendicularly with respect to a central axis of the seal in such a way that the axis represents a normal with respect to the plane. One advantage of the mirror symmetry of the seal with respect to said plane is the independence of the function from the installation direction.

Conventional arrangements, seals and compressors with arrangements of this type had the disadvantage that, as a consequence of the positive pressure from the radial section of the gap and the width of the gap, the seal has been pressed out of the seal chamber into the gap, at least at some locations of the circumference, and was finally destroyed as a consequence of this deformation. The leaks which are produced by this require complicated dismantling, which seriously restricts the availability of the machine. In addition, a seal which is susceptible to defects in this way represents a serious safety risk, since, for example, toxic process fluid can exit under high pressure into the surroundings.

The invention is particularly preferred in the case of a diameter of the annular seal of more than 1000 mm. At these dimensions, potential thermal relative expansions require a large radial gap of the cover from the housing main body or of the two components to be sealed with respect to one another of a pressure vessel.

The supporting ring particularly expediently has a radial extent which is larger than the radial gap to be sealed of the radial section, with the result that an entry of the seal into the radial section is ruled out in principle even in the case of great pressure differences of the seal.

The greater resistance of the supporting element to a deformation with respect to the jacket element can be realized by the fact that the supporting element is composed of metal and the jacket element is composed of a plastic which is flexible such that the axial bounding walls bear against the side walls of the seal chamber under the pressure of the process fluid in the axial section of the gap.

The bearing of the seal against the side walls of the seal chamber and the bearing of the axial bounding walls of the recess which extends in the seal in the circumferential direction can expediently be assisted by means of a V-shaped spring element which extends in the circumferential direction. It is expedient here if the spring element has a prestress with respect to the axial bounding walls. The region of the V-shaped cross section of the spring element, where the two limbs of the V-shape meet, is expediently arranged radially on the inside, with the result that the two diverging ends of the V-shape bear, from the inside in the recess, against the axial bounding walls of the recess and press them apart in the axial direction.

Another expedient development provides that, at the point where the V-shape of the spring makes contact from the inside with the axial bounding walls, said axial bounding walls in each case have an inwardly extending projection which is configured in such a way that the spring element is secured by the projection against escaping from the circumferential recess.

A further advantageous development of the invention provides that the supporting element has a contour on the side which faces the jacket element, and the jacket element has a corresponding contour on the side which lies opposite the supporting element, with the result that the two contours produce a positively locking connection with one another. To this end, the contour on the supporting element can expediently be a circumferential elevation and, in a corresponding manner thereto, a circumferential recess on the jacket element.

BRIEF DESCRIPTION OF THE DRAWINGS

In the following text, the invention is described in greater detail using one specific exemplary embodiment and with reference to drawings. In addition to the specific exemplary embodiments, additional possibilities of implementing the invention result for a person skilled in the art from the description and an arbitrary combination of the main claims with the subclaims which refer back to them. In the drawings:

FIG. 2 shows the detail II from FIG. 1, illustrating a seal according to the invention in an arrangement according to the invention.

Figure 1:
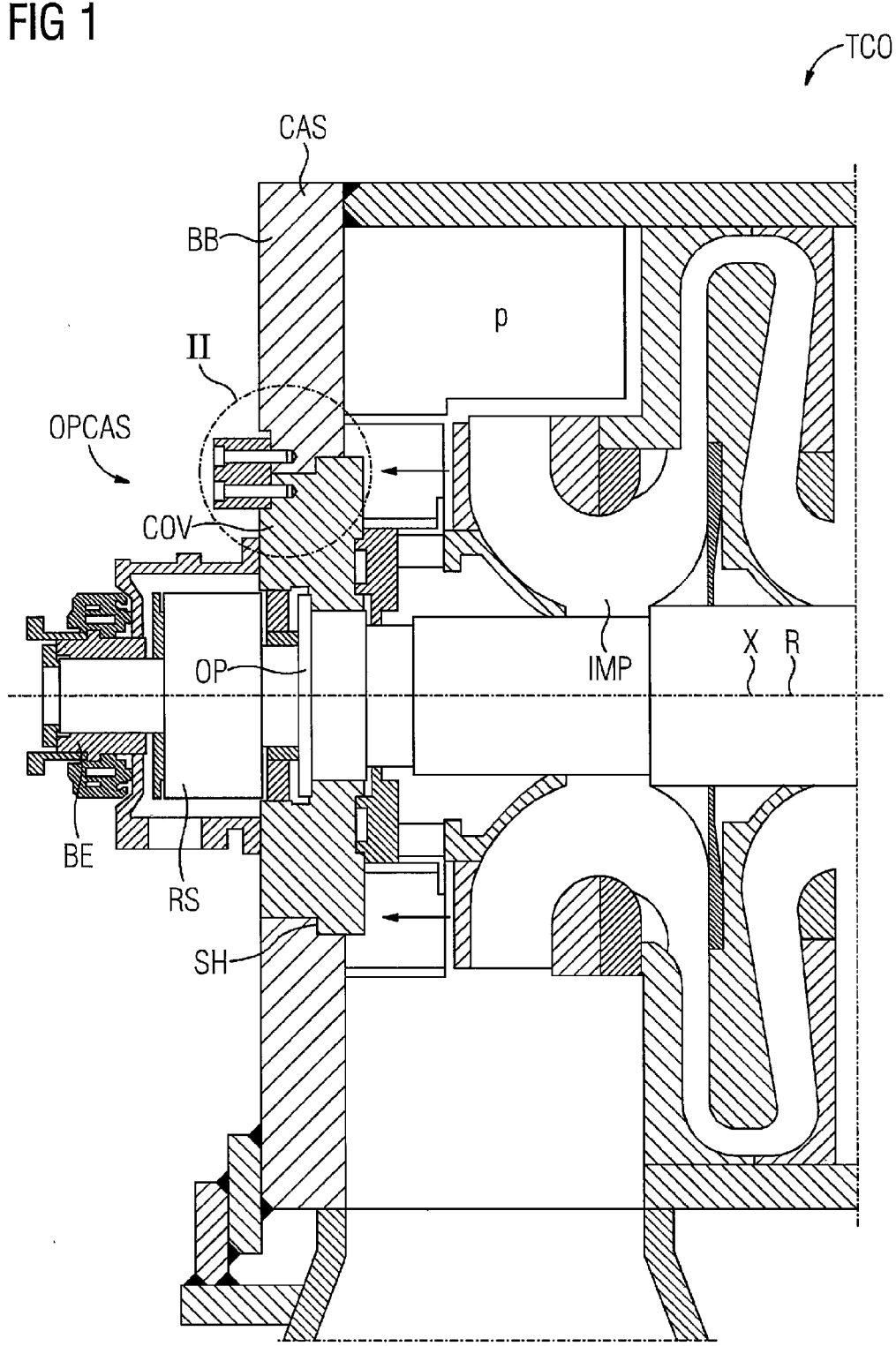
FIG. 1 shows a cross section through a pressure vessel according to the invention of a turbocompressor.

The terminology of this patent application is such that all directional indications, such as axial, radial or circumferential direction, relate to a machine axis X, as is specified in FIGS. 1 and 2.

DETAILED DESCRIPTION OF INVENTION

FIG. 1 shows a pressure vessel CAS according to the invention in the particularly advantageous application of the invention in a turbocompressor TCO. The turbocompressor TCO has a rotor R which extends along the machine axis X and is guided from the interior of the pressure vessel CAS through an opening OP of a cover COV to the outside. The cover COV is inserted from the inside into the pressure vessel CAS, where it is pressed outward by a positive pressure T in the pressure vessel CAS against a shoulder SH on the pressure vessel CAS, which shoulder extends in the circumferential direction at the housing opening OPCAS which is to be closed by way of the cover COV. Moreover, the cover COV is the carrier of a radial bearing BE and a shaft seal arrangement RS. The pressure vessel CAS has a vessel main body BB and a cover COV which closes the vessel main body opening OPCAS.

The detail which is indicated by II in FIG. 1 is shown in FIG. 2. A gap GAP which extends in the circumferential direction is situated between the pressure vessel CAS and the cover COV. The region of the gap GAP which is shown in FIG. 2 is L-shaped and can be divided into an axial section APG and a radial section RPG. The radial section RPG tends to narrow under the internal pressure P of the pressure vessel. The axial section APG has a width W which has to meet the requirements of thermal relative expansions between the cover COV and the vessel main body BG.

Depending on the size of the external diameter or the radius of the cover COV, on which the axial section APG is situated, a sufficient movement play has to result under predefined thermal parameters from the width W in the region of the axial section. In the case of a radius of approximately 500 mm, the width W should not be less than 2 mm if a temperature difference between at least parts of the cover COV and the housing main body BB can be up to 50 Kelvin. This approximate value applies to metallic materials which have substantially identical coefficients of expansion for the cover COV and the main body BB. In the case of different coefficients of thermal expansion, this dimensioning rule is to be adapted.

A seal chamber SCAV of rectangular cross section which extends in the circumferential direction is provided at the point where the axial section APG and the radial section RPG meet.

A seal SEA is arranged in the seal chamber SCAV. The seal SEA comprises the following components which extend in each case in the circumferential direction: supporting element SE, jacket element JE and spring element EEL.

The supporting element SE is situated radially on the inside and the jacket element JE adjoins the supporting element SE radially on the outside, the interface between the two elements being provided with a contour CCN which ensures a positively locking connection. In concrete terms, the supporting element SE has a projection PRO which extends in the circumferential direction and is reproduced in a positively locking manner in the jacket element JE in the form of a recess which extends in the circumferential direction. The supporting element SE has a radial height which is greater than the radial width W of the axial section APG. The axial extent of the supporting element SE is smaller than the axial width of the seal chamber SCAV. In this way, the supporting element SE does not prevent an axial reduction in the width of the radial section RPG of the gap GAP. The supporting element SE is made from a less readily deformable material than the jacket element JE—it is composed of metal here.

The jacket element JE which is composed of plastic has a recess RE which points radially to the outside and extends in the circumferential direction. The recess RE has a substantially rectangular cross section and is delimited on both sides by two axial bounding walls ALW.

A spring element EEL of V-shaped cross section is arranged in the recess RE in such a way that the V-shape of the elastic spring element EEL which extends in the circumferential direction points radially to the outside with its opening. In other words, the region of the V-shaped cross section, a merging edge EDG at which two limbs SHL of the V-shape converge, is situated radially to the inside of the recess RE. The two radially outer ends of the two limbs of the V-shape of the cross section make linear contact with the axial bounding walls ALW on both sides. As a result of this prestressed contact, the two axial bounding walls ALW are pressed axially apart from one another and contact occurs with axial bounding walls of the seal chamber SCAV. Under the action of the positive pressure P from the interior of the pressure vessel CAS, the recess RE of the seal SEA is additionally widened and contact of the seal SEA with the bounding walls of the seal chamber SCAV occurs, which contact produces the sealing action.

The invention claimed is:

1. An arrangement, comprising:
 an annular seal which extends about a machine axis;
 a vessel comprising a main body and a cover, the cover forming a groove, by an outer cylindrical surface and an inner cylindrical surface and a radial wall connecting the cylindrical surfaces;
 wherein the annular seal is provided for sealing an L-shaped gap, wherein the L-shaped gap extends along a circumferential direction between the vessel main body and the cover, a radial section of the gap extending in the radial direction and circumferential direction and an axial section of the gap extending in the axial direction and circumferential direction; and a seal chamber provided in the region where the radial section and the axial section meet, wherein the seal chamber is widened radially and axially with respect to the dimensions of the gap sections, wherein the seal is arranged in the seal chamber and the groove, a higher pressure prevailing in the radial section than in the axial section, which pressure difference is sealed by means of the seal, wherein the seal includes a supporting ring which is arranged radially on the inside and is made from a first material and the supporting ring contacts the outer cylindrical surface, wherein a jacket element which is made from a second material which is more readily deformable than the first material adjoins the supporting ring radially on the outside, wherein the jacket element includes a circumferential recess radially on the outside, in such a way that two axial bounding walls of the recess of the jacket element are deformed under pressure loading from the direction of the radial section in such a way that the jacket element is widened axially, and wherein the seal is minor-symmetrical with regard to a radial plane, wherein the supporting ring is disposed in the seal chamber at the intersection of the axial section of the gap and the radial section of the gap and includes a radial height that is greater than a radial width of the axial section of the gap.

2. The arrangement as claimed in claim 1,
wherein a spring element is provided in the recess, which presses the two axial bounding walls axially apart from one another.

3. The arrangement as claimed in claim 2,
wherein the spring element includes a V-shaped cross-sectional profile with a radially inner merging edge of the two limbs of the V-shape.

4. The arrangement as claimed in claim 1,
wherein the supporting element includes a contour on the side of the jacket element, and
wherein the jacket element includes a corresponding contour, with the result that there is a positively locking connection between the jacket element and the supporting element.

5. The arrangement or seal as claimed in claim 4,
wherein the supporting element includes, on the side of the jacket element, the contour which extends in the circumferential direction, and
wherein the jacket element includes the corresponding contour which extends in the circumferential direction.

6. A pressure vessel, comprising:
an arrangement as claimed in claim 1.

* * * * *